United States Patent
Mah et al.

[11] Patent Number: 5,961,795
[45] Date of Patent: *Oct. 5, 1999

[54] ELECTROCHEMICAL CELL HAVING A RESILIENT FLOW FIELD

[75] Inventors: Dennie Turin Mah, Wilmington; James Arthur Trainham, III, Newark, both of Del.; John Scott Newman, Kensington, Calif.; Clarence Garlan Law, Jr., West Trenton, N.J.

[73] Assignee: E. I. du Pont de Nemours and Company, Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/821,147

[22] Filed: Mar. 20, 1997

Related U.S. Application Data

[63] Continuation of application No. 08/431,589, May 1, 1995, abandoned, which is a continuation-in-part of application No. 08/156,196, Nov. 22, 1993, Pat. No. 5,411,641, and application No. 08/246,909, May 20, 1994, Pat. No. 5,580,437, which is a continuation-in-part of application No. 08/156,196, Nov. 22, 1993, Pat. No. 5,411,641.

[51] Int. Cl.$^6$ ........................................... C25B 9/00
[52] U.S. Cl. ........................ 204/252; 204/252; 204/283; 204/263
[58] Field of Search .................... 204/252, 282, 204/283, 263; 424/30

[56] References Cited

U.S. PATENT DOCUMENTS

| | | | |
|---|---|---|---|
| 3,453,187 | 7/1969 | Slatin | 204/69 |
| 3,729,395 | 4/1973 | Caron et al. | 204/59 R |
| 4,139,447 | 2/1979 | Faron et al. | 204/239 |
| 4,169,025 | 9/1979 | Needes | 204/98 |
| 4,191,618 | 3/1980 | Coker et al. | 204/98 |
| 4,210,501 | 7/1980 | Dempsey et al. | 204/129 |
| 4,214,969 | 7/1980 | Lawrance | 204/255 |

(List continued on next page.)

FOREIGN PATENT DOCUMENTS

| | | |
|---|---|---|
| 1 179 631 | 12/1984 | Canada . |
| 1 195 949 | 10/1985 | Canada . |
| 0 319 489 | 6/1989 | European Pat. Off. . |
| 0 522 382 | 6/1992 | European Pat. Off. . |
| 0 522 382 A1 | 1/1993 | European Pat. Off. . |
| 0 610 946 | 2/1994 | European Pat. Off. . |
| 0 611 836 A1 | 8/1994 | European Pat. Off. . |
| 0 629 015 A1 | 12/1994 | European Pat. Off. . |
| 2 312 297 | 3/1973 | Germany . |

(List continued on next page.)

OTHER PUBLICATIONS

Jewulski, J. R., et al., Solid State Proton Conductors, Final Report, Work Performed Under Contract No.: DE–AC21–88MC24218 for U.S. Department of Energy, 1–99, Dec. 1990.

Minz, F.R. (Dr.), HC1–Electrolysis—Technology for Recycling Chlorine, *Bayer AG*, Conference on Electrochemical Processing Innovation, & Progress, Glasgow, Scotland, UK Apr. 21–Apr. 23, 1993.

Takenaka, H., et al., Solid Polymer Electrolyte Water Electrolysis, *Int. J. Hydrogen Energy*, 7(5), 397–403, 1982 No month available.

(List continued on next page.)

*Primary Examiner*—Kathryn L. Gorgos

[57] ABSTRACT

The invention relates to an electrochemical cell which has an electrode, a membrane disposed in contact with one side of the electrode, and a resilient flow field disposed on the other side of the electrode. The resilient flow field provides uniform electrical contact with the electrode. Such a flow field is preferably an elastomer, which can be be made by molding techniques, thereby decreasing the cost and increasing the ease with which such a flow field may be manufactured. The resilient flow field of the present invention is particularly useful in converting anhydrous hydrogen halide directly to essentially dry halogen gas, such as anhydrous hydrogen chloride to chlorine gas, although it may be used in a cell which converts aqueous reactants.

35 Claims, 2 Drawing Sheets

U.S. PATENT DOCUMENTS

| | | |
|---|---|---|
| 4,224,121 | 9/1980 | Dempsey et al. .......................... 204/98 |
| 4,294,671 | 10/1981 | Balko ...................................... 204/128 |
| 4,311,568 | 1/1982 | Balko ...................................... 204/128 |
| 4,341,604 | 7/1982 | de Nora et al. .......................... 204/98 |
| 4,343,689 | 8/1982 | de Nora et al. ........................ 204/253 |
| 4,343,690 | 8/1982 | de Nora .................................. 204/263 |
| 4,536,263 | 8/1985 | de Nora et al. .......................... 204/98 |
| 4,592,822 | 6/1986 | de Nora .................................. 204/252 |
| 4,595,579 | 6/1986 | Prudhon et al. ........................ 423/487 |
| 4,655,887 | 4/1987 | Oda et al. ................................ 204/98 |
| 4,666,574 | 5/1987 | Oda et al. ................................ 204/98 |
| 4,693,797 | 9/1987 | de Nora .................................. 204/128 |
| 4,789,443 | 12/1988 | de Nora et al. .......................... 204/98 |
| 4,830,721 | 5/1989 | Bianchi et al. ......................... 204/151 |
| 4,909,912 | 3/1990 | Oda et al. ................................ 204/98 |
| 4,921,585 | 5/1990 | Molter ..................................... 204/72 |
| 4,959,132 | 9/1990 | Fedkiw, Jr. .............................. 204/101 |
| 5,223,102 | 6/1993 | Fedkiw, Jr. et al. ..................... 204/78 |

FOREIGN PATENT DOCUMENTS

| | | |
|---|---|---|
| 56-36873 | 8/1981 | Japan . |
| 941560 | 10/1994 | Norway . |
| 363424 | 12/1931 | United Kingdom . |
| 861978 | 3/1961 | United Kingdom . |
| WO 95/14797 | 6/1995 | WIPO . |

OTHER PUBLICATIONS

Wilson, M.S. et al., High Performance Catalyzed Membranes of Ultra–low Pt Loadings for Polymer Electrolyte Fuel Cells, *J. Electrochem. Soc.*, 2, L–28–L–30, Feb. 1992.

Appleby, A.J. et al., Solid Polymer Acid Electrolytes, *Fuel Cell Handbook*, 10, 286–312, & 1989.

ELECTROCHEMICAL CELL HAVING A RESILIENT FLOW FIELD

This application is a continuation of U.S. application Ser. No. 08/431,589 filed May 1, 1995, now U.S. Pat. No. 5,616,220, issued Apr. 1, 1997, which was surrendered in favor of the present application. Said 08/431,589 application is a continuation-in-part of U.S. Application Ser. No. 08/246,909, filed May 20, 1994, now U.S. Pat. No. 5,580,437, issued on Dec. 3, 1996, which was surrendered in favor of reissue application U.S. Applicaiton Ser. No. 09/093,535 filed June 8, 1998, which is a continuation-in-part of U.S. Application Ser. No. 08/156,196, now abandoned.

BACKGROUND OF THE INVENTION

1. Field of the Invention

The present invention relates to an electrochemical cell having a resilient flow field which provides uniform contact with an electrode of the cell. In particular, the resilient flow field is useful in a cell for converting anhydrous hydrogen halide, in particular, hydrogen chloride, hydrogen fluoride, hydrogen bromide and hydrogen iodide, to a dry halogen gas, such as chlorine, fluorine, bromine, or iodine. In addition, the resilient flow field, which preferably comprises an elastomer, may be used in an electrochemical cell which converts an aqueous reactant to an aqueous product.

2. Description of the Related Art

Hydrogen chloride (HCl) or hydrochloric acid is a reaction by-product of many manufacturing processes which use chlorine. For example, chlorine is used to manufacture polyvinyl chloride, isocyanates, and chlorinated hydrocarbons/fluorinated hydrocarbons, with hydrogen chloride as a by-product of these processes. Because supply so exceeds demand, hydrogen chloride or the acid produced often cannot be sold or used, even after careful purification. Shipment over long distances is not economically feasible. Discharge of the acid or chloride ions into waste water streams is environmentally unsound. Recovery and feedback of the chlorine to the manufacturing process is the most desirable route for handling the HCl by-product.

A number of commercial processes have been developed to convert HCl into usable chlorine gas. See, e.g., F. R. Minz, "HCl-Electrolysis—Technology for Recycling Chlorine", Bayer AG, Conference on Electrochemical Processing, Innovation & Progress, Glasgow, Scotland, UK, Apr. 21–Apr. 23, 1993.

Currently, thermal catalytic oxidation processes exist for converting anhydrous HCl and aqueous HCl into chlorine. Commercial processes, known as the "Shell-Chlor", the "Kel-Chlor" and the "MT-Chlor" processes, are based on the Deacon reaction. The original Deacon reaction as developed in the 1870's made use of a fluidized bed containing a copper chloride salt which acted as the catalyst. The Deacon reaction is generally expressed as follows:

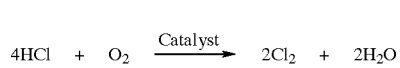
(1)

where the following catalysts may be used, depending on the reaction or process in which equation (1) is used.

| Catalyst | Reaction or Process |
|---|---|
| Cu | Deacon |
| Cu, Rare Earth, Alkali | Shell-Chlor |
| $NO_2$, $NOHSO_4$ | Kel-Chlor |
| $Cr_mO_n$ | MT-Chlor |

The commercial improvements to the Deacon reaction have used other catalysts in addition to or in place of the copper used in the Deacon reaction, such as rare earth compounds, various forms of nitrogen oxide, and chromium oxide, in order to improve the rate of conversion, to reduce the energy input and to reduce the corrosive effects on the processing equipment produced by harsh chemical reaction conditions. However, in general, these thermal catalytic oxidation processes are complicated because they require separating the different reaction components in order to achieve product purity. They also involve the production of highly corrosive intermediates, which necessitates expensive construction materials for the reaction systems. Moreover, these thermal catalytic oxidation processes are operated at elevated temperatures of 250° C. and above.

Electrochemical processes exist for converting aqueous HCl to chlorine gas by passage of direct electrical current through the solution. The current electrochemical commercial process is known as the Uhde process. In the Uhde process, aqueous HCl solution of approximately 22% is fed at 65° to 80° C. to both compartments of an electrochemical cell, where exposure to a direct current in the cell results in an electrochemical reaction and a decrease in HCl concentration to 17% with the production of chlorine gas and hydrogen gas. A polymeric separator divides the two compartments. The process requires recycling of dilute (17%) HCl solution produced during the electrolysis step and regenerating an HCl solution of 22% for feed to the electrochemical cell. The overall reaction of the Uhde process is expressed by the equation:

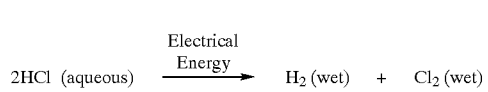
(2)

As is apparent from equation (2), the chlorine gas produced by the Uhde process is wet, usually containing about 1% to 2% water. This wet chlorine gas must then be further processed to produce a dry, usable gas. If the concentration of HCl in the water becomes too low, it is possible for oxygen to be generated from the water present in the Uhde process. This possible side reaction of the Uhde process due to the presence of water, is expressed by the equation:

$$2H_2O \rightarrow O_2 + 4H^+ + 4e^-$$ (3)

Further, the presence of water in the Uhde system limits the current densities at which the cells can perform to less than 500 amps./ft.$^2$, because of this side reaction. The side reaction results in reduced electrical efficiency and corrosion of the cell components.

Another electrochemical process for processing aqueous HCl has been described in U.S. Pat. No. 4,311,568 to Balko. Balko employs an electrolytic cell having a solid polymer electrolyte membrane. Hydrogen chloride, in the form of hydrogen ions and chloride ions in aqueous solution, is introduced into an electrolytic cell. The solid polymer electrolyte membrane is bonded to the anode to permit transport from the anode surface into the membrane. In Balko, controlling and minimizing the oxygen evolution side reaction is an important consideration. Evolution of oxygen decreases cell efficiency and leads to rapid corrosion of components of the cell. The design and configuration of the anode pore size and electrode thickness employed by Balko maximizes transport of the chloride ions. This results in effective chlorine evolution while minimizing the evolution of oxygen, since oxygen evolution tends to increase under conditions of chloride ion depletion near the anode surface. In Balko, although oxygen evolution may be minimized, it is not eliminated. As can be seen from FIGS. 3 to 5 of Balko, as the overall current density is increased, the rate of oxygen evolution increases, as evidenced by the increase in the concentration of oxygen found in the chlorine produced. Balko can run at higher current densities, but is limited by the deleterious effects of oxygen evolution. If the Balko cell were to be run at high current densities, the anode would be destroyed.

To obtain maximum efficiency from an electrochemical cell, it is very important to keep all of the components in uniform contact with each other. This is very easy to accomplish in a laboratory-size cell, typically 100 to 500 $cm^2$ in size. However, on commercial cells that are typically 1 to 2 $m^2$, it is very difficult to keep the parts intimately in contact with each other. It is especially important to keep the parts in uniform contact so that the membrane is not pinched or pierced. U.S. Pat. No. 4,343,690 to de Nora has a resilient current collector suitable for use in an electrolytic cell for processing an aqueous sodium chloride solution. The current collector is a substantially open mesh planar electroconductive metal-wire mat or screen, i.e., fabric which is resistant to the electrolyte and the electrolysis products. When clamping pressure is applied to the cell, the wire loops of the mat deflect and slide laterally, thereby distributing pressure over the surfaces with which it contacts. Nickel, stainless steel, copper, silver-coated copper or the like are suitable for the wire when the wire is cathodic. If the compressible wire is anodic, the collector wire must resist chlorine and anodic attack. Accordingly, the wires may be of a valve metal such as titanium or niobium, which are costly. These metals are preferably coated with an electroconductive, non-passivating layer resistant to anodic attack, such as a platinum group metal or oxide, or a bimetallic spinel perovskite, etc., which adds to the cost of the current collector.

Accordingly, there exists a need for directly producing essentially dry halogen gas without having to first dissolve the hydrogen halide in water, and for a current collector which can be used in such a process, or in an aqueous process, which can stand up to corrosion by the anodic or the cathodic fluid. There also exists a need for a current collector which is easy and inexpensive to manufacture.

SUMMARY OF THE INVENTION

The present invention solves the problems of the prior art by providing an electrochemical cell for directly producing essentially dry halogen gas from essentially anhydrous hydrogen halide. This process allows for direct processing of anhydrous hydrogen halide which is a by-product of manufacturing processes, without first dissolving the hydrogen halide in water. This direct production of essentially dry halogen gas, when done, for example, for chlorine gas, is less capital intensive than processes of the prior art, which require separation of water from the chlorine gas. This direct production of essentially dry chlorine gas also requires lower investment costs than the electrochemical conversions of hydrogen chloride of the prior art. This advantage can translate directly into lower power costs per pound of say, chlorine, generated than in the aqueous electrochemical processes of the prior art. The direct production of essentially dry chlorine gas also provides a process which produces drier chlorine gas with fewer processing steps as compared to that produced by electrochemical or catalytic systems of the prior art, thereby simplifying processing conditions and reducing capital costs.

Moreover, the present invention solves the problems of the prior art by providing an electrochemical cell which has flow field made of a flexible, or resilient, material. This flow field, whether used in an aqueous or an anhydrous environment, maintains uniform pressure and thus uniform contact on the surface of the electrode, thereby preventing damage to the membrane. With this feature, higher current densities can be run over the life of the cell. In addition, the flexible flow field is preferably made of an elastomeric material which can be made by molding techniques. Thus, the flow field of the present invention is easier and less expensive to make than current collectors of the prior art. These advantages make the anhydrous process of the present invention even more practicable and economically attractive.

In a preferred embodiment of the present invention, there is provided an electrochemical cell for directly producing essentially dry halogen gas from essentially anhydrous hydrogen halide, comprising means for oxidizing molecules of essentially anhydrous hydrogen halide to produce essentially dry halogen gas and protons; cation-transporting means for transporting the protons therethrough; means for reducing the transported protons, wherein the cation-transporting means has one side disposed in contact with the oxidizing means, and another side disposed in contact with the reducing means; current conducting means disposed on the other side of the oxidizing means for conducting current to and from the oxidizing means, the cation-transporting means and the reducing means; and mass flow field means disposed between the cation-transporting means and the current conducting means for providing uniform electrical contact between the oxidizing means and the current conducting means, wherein the mass flow field means comprises a resilient material.

DESCRIPTION OF THE PREFERRED EMBODIMENTS

Reference will now be made in detail to the present preferred embodiments of the invention as illustrated in the accompanying drawings.

In accordance with a first and second embodiment of the present invention, there is provided an electrochemical cell for the direct production of essentially dry halogen gas from anhydrous hydrogen halide. Such a cell is shown generally at 10 in FIG. 1. The cell of the present invention will be described with respect to a preferred embodiment of the present invention, which directly produces essentially dry chlorine gas from essentially anhydrous hydrogen chloride. This cell may alternatively be used to produce other halogen gases, such as bromine, fluorine and iodine from a respective anhydrous hydrogen halide, such as hydrogen bromide, hydrogen fluoride and hydrogen iodide. The term "direct" means that the electrochemical cell obviates the need to remove water from the halogen gas produced or the need to convert essentially anhydrous hydrogen halide to aqueous hydrogen halide before electrochemical treatment. In the first embodiment, chlorine gas, as well as hydrogen, is produced in this cell. In a second embodiment, water, as well as chlorine gas, is produced by this cell, as will be explained more fully below.

Figure 1:
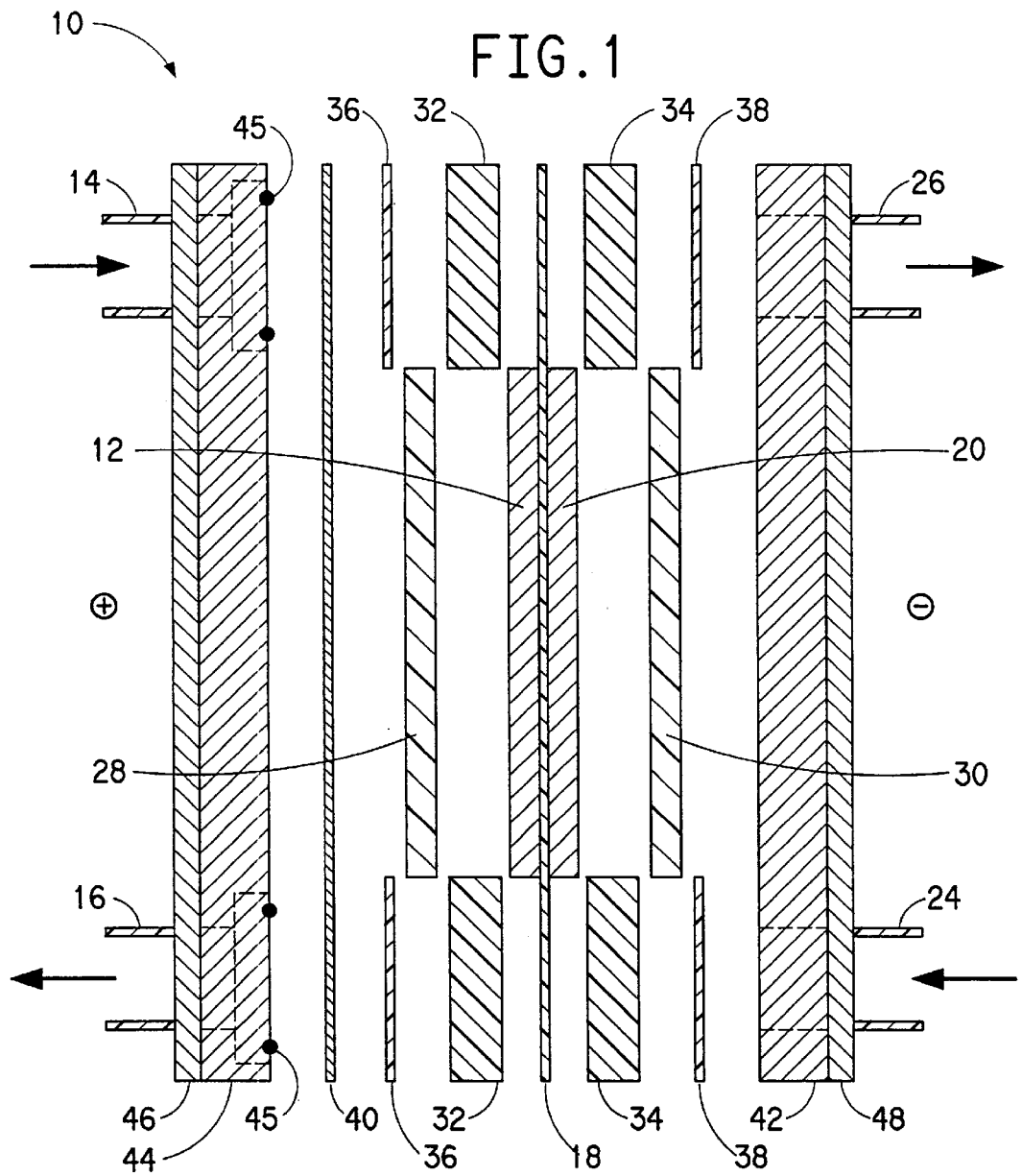
FIG. 1 is an exploded, cross-sectional view of an electrochemical cell for producing halogen gas from anhydrous hydrogen halide according to a first and second embodiment of the present invention.
Figure 1A:
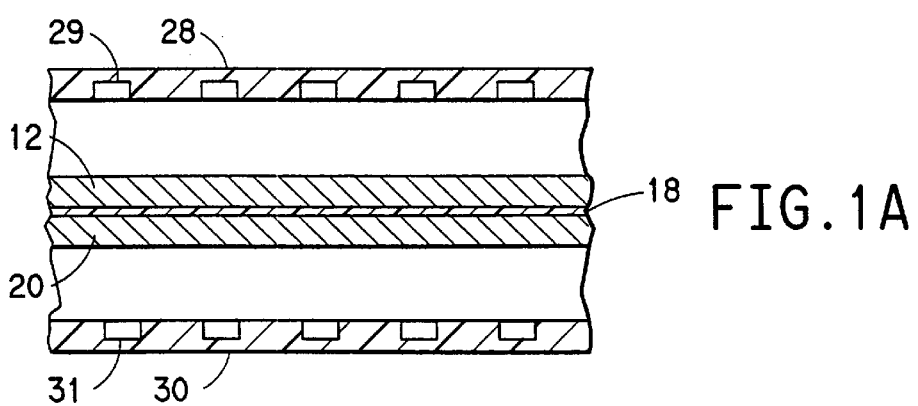
FIG. 1A is a cut away, top cross-sectional view of the anode and cathode mass flow fields as shown in FIG. 1.

The electrochemical cell of the first and second embodiments comprises means for oxidizing molecules of essentially anhydrous hydrogen halide to produce essentially dry halogen gas and protons. The oxidizing means is an electrode, or more specifically, an anode 12 as shown in FIGS. 1 and 1A. On the anode side, electrochemical cell 10 has an anode-side inlet 14 and an anode-side outlet 16. Since in the preferred embodiment, anhydrous HCl is carried through the inlet, and chlorine gas is carried through the outlet, the inlet and the outlet may be lined with a copolymer of tetrafluoroethylene with perfluoroalkylvinyl ether, sold under the trademark TEFLON® (hereinafter referred to as "PFA" by E. I. du Pont de Nemours and Company of Wilmington, Del. (hereinafter referred to as "DuPont").

The electrochemical cell of the first and second embodiments also comprises cation-transporting means for transporting the protons therethrough, where one side of the oxidizing means is disposed in contact with one side of the cation-transporting means. Preferably, the cation-transporting means is a cation-transporting membrane 18 as shown in FIGS. 1 and 1A. More specifically, membrane 18 may be a proton-conducting membrane. Membrane 18 may be a commercial cationic membrane made of a fluoro- or perfluoropolymer, preferably a copolymer of two or more fluoro or perfluoromonomers, at least one of which has pendant sulfonic acid groups. The presence of carboxylic groups is not desirable, because those groups tend to decrease the conductivity of the membrane when they are protonated. Various suitable resin materials are available commercially or can be made according to patent literature. They include fluorinated polymers with side chains of the type —$CF_2CFRSO_3H$ and —$OCF_2CF_2CF_2SO_3H$, where R is a F, Cl, $CF_2Cl$, or a $C_1$ to $C_{10}$ perfluoroalkyl radical. The membrane resin may be, for example, a copolymer of tetrafluoroethylene with $CF_2=CFOCF_2CF(CF_3)$ $OCF_2CF_2SO_3H$. Sometimes those resins may be in the form that has pendant —$SO_2F$ groups, rather than —$SO_3H$ groups. The sulfonyl fluoride groups can be hydrolyzed with potassium hydroxide to —$SO_3K$ groups, which then are exchanged with an acid to —$SO_3H$ groups. Suitable perfluorinated cationic membranes, which are made of hydrated, copolymers of polytetrafluoroethylene and poly-sulfonyl fluoride vinyl ether-containing pendant sulfonic acid groups, are offered by DuPont under the trademark "NAFION" (hereinafter referred to as NAFION®). In particular, NAFION® membranes containing pendant sulfonic acid groups include NAFION® 117, NAFION® 324 and NAFION® 417. The first type of NAFION® is unsupported and has an equivalent weight of 1100 g., equivalent weight being defined as the amount of resin required to neutralize one liter of a 1M sodium hydroxide solution. The other two types of NAFION® are both supported on a fluorocarbon fabric, the equivalent weight of NAFION® 417 also being 1100 g. NAFION® 324 has a two-layer structure, a 125 μm-thick membrane having an equivalent weight of 1100 g., and a 25 μm-thick membrane having an equivalent weight of 1500 g.

Although the present invention describes the use of a solid polymer electrolyte membrane, it is well within the scope of the invention to use other cation-transporting membranes which are not polymeric. For example, proton-conducting ceramics such as beta-alumina may be used. Beta-alumina is a class of nonstoichiometric crystalline compounds having the general structure $Na_2O_x \cdot Al_2O_3$, in which x ranges from 5 (β"-alumina) to 11 (β-alumina). This material and a number of solid electrolytes which are useful for the invention are described in the *Fuel Cell Handbook*, A. J. Appleby and F. R. Foulkes, Van Nostrand Reinhold, N.Y., 1989, pages 308–312. Additional useful solid state proton conductors, especially the cerates of strontium and barium, such as strontium ytterbiate cerate ($SrCe_{0.95}Yb_{0.05}O_{3-\alpha}$) and barium neodymiate cerate ($BaCe_{0.9}Nd_{0.01}O_{3-\alpha}$) are described in a final report, DOE/MC/24218-2957, Jewulski, Osif and Remick, prepared for the U.S. Department of Energy, Office of Fossil Energy, Morgantown Energy Technology Center by Institute of Gas Technology, Chicago, Ill., December, 1990.

The electrochemical cell of the first and second embodiments also comprises means for reducing the transported protons, where the reducing means is disposed in contact with the other side of the cation-transporting means. The reducing means comprises a cathode 20, where cathode 20 is disposed in contact with the other side (as opposed to the side which is in contact with the anode) of membrane 18 as illustrated in FIGS. 1 and 1A. Electrochemical cell 70 has a cathode-side inlet 24 and a cathode-side outlet 26 as shown in FIG. 1. Since in the preferred embodiment, anhydrous HCl is processed, and since some chlorides pass through the membrane and consequently, HCl is present on the cathode-side of the cell, the cathode inlet and the outlet may be lined with PFA.

As known to one skilled in the art, if electrodes are placed on opposite faces of membrane, cationic charges (protons in the HCl reaction being described) are transported through the membrane from anode to cathode, while each electrode carries out a half-cell reaction. In the first and second embodiments, molecules of anhydrous hydrogen fluoride are transported to the surface of the anode through anode-side inlet 14. The molecules of the anhydrous hydrogen chloride are oxidized to produce essentially dry chlorine gas and protons. The essentially dry chlorine gas exits through anode-side outlet 16 as shown in FIG. 1. The protons are transported through the membrane and reduced at the cathode. This is explained in more detail below.

The anode and the cathode may comprise porous, gas-diffusion electrodes. Such electrodes provide the advantage of high specific surface area, as known to one skilled in the art. The anode and the cathode comprise an electrochemically active material disposed adjacent, meaning at or under, the surface of the cation-transporting membrane. A thin film of the electrochemically active material may be applied directly to the membrane. Alternatively, the electrochemically active material may be hot-pressed to the membrane, as shown in A. J. Appleby and E. B. Yeager, Energy, Vol. 11, 137 (1986). Alternatively, the electrochemically active material may be deposited into the membrane, as shown in U.S. Pat. No. 4,959,132 to Fedkiw. The electrochemically active material may comprise any type of catalytic or metallic material or metallic oxide, as long as the material can support charge transfer. Preferably, the electrochemically active material may comprise a catalyst material such as platinum, ruthenium, osmium, rhenium, rhodium, iridium, palladium, gold, titanium or zirconium and the oxides, alloys or mixtures thereof. However, in general, the oxides of these materials are not used for the cathode. Other catalyst materials suitable for use with the present invention may include, but are not limited to, transition metal macro cycles in monomeric and polymeric forms and transition metal oxides, including perovskites and pyrochores.

In a hot-pressed electrode, the electrochemically active material may comprise a catalyst material on a support material. The support material may comprise particles of carbon and particles of polytetrafluoroethylene, or PTFE, a tetrafluoroethylene fluoropolymer resin which is sold under the trademark TEFLON® (hereinafter referred to as PTFE), commercially available from DuPont. The electrochemically active material may be bonded by virtue of the PTFE to a support structure of carbon paper or graphite cloth and hot-pressed to the cation-transporting membrane. The hydrophobic nature of PTFE does not allow a film of water to form at the anode. A water barrier in the electrode would hamper the diffusion of HCl to the reaction sites. The electrodes are preferably hot-pressed into the membrane in order to have good contact between the catalyst material and the membrane.

The loadings of electrochemically active material may vary based on the method of application to the membrane. Hot-pressed, gas-diffusion electrodes typically have loadings of 0.10 to 0.50 mg/cm$^2$. Lower loadings are possible with other available methods of deposition, such as distributing them as thin films from inks onto the membranes, as described in Wilson and Gottesfeld, "High Performance Catalyzed Membranes of Ultra-low Pt Loadings for Polymer Electrolyte Fuel Cells", Los Alamos National Laboratory, J. Electrochem. Soc., Vol. 139, No. 2 L28–30, 1992, where the inks contain solubilized NAFION® to enhance the catalyst-ionomer surface contact and to act as a binder to the NAFION® Perfluorinated membrane sheet. With such a system, loadings as low as 0.017 mg active material per cm$^2$ have been achieved.

The electrochemical cell of the first and second embodiments further comprises an anode flow field 28 disposed in contact with the anode and a cathode mass flow field 30 disposed in contact with the cathode. The flow fields are electrically conductive, and act as both mass and current flow fields. Anode mass flow field 28 includes a plurality of anode flow channels 29, and cathode mass flow field 30 includes a plurality of cathode flow channels 31 as shown in FIG. 1A. The purpose of the anode mass flow field and channels 29 is to get reactants, such as anhydrous HCl in the first and second embodiments, to the anode, and products, such as essentially dry chlorine gas, from the anode. The purpose of the cathode mass flow field and channels 31 is to get reactants, such as liquid water in the first embodiment, or oxygen gas in the second embodiment, to the cathode, and products, such as hydrogen gas in the first embodiment, or water vapor (H$_2$O(g)) in the second embodiment, from the cathode. Water vapor may be needed to keep the membrane hydrated. However, water vapor may not be necessary in the second embodiment because of the water produced by the electrochemical reaction of the oxygen (O$_2$) added as discussed below.

At least one of the mass flow fields comprises a resilient material. This provides uniform contact pressure, and thus uniform electrical contact, with the electrode, or more specifically, between the electrode and the current bus. Preferably, the flow field is conductive. In order to do this, the resilient material of the flow field may be filled with a conductive material. The conductive material may be, for example, a metal, or may be carbon. Enough conductive material is added so that the conductive particles are in intimate contact. However, if too much conductive material is added, this diminishes the resilient properties of the material. Preferably, the flow field is made of a chemically resistant material. The resilient material used for the flow field may be an elastomer, such as the dipolymer ethylene/propylene, the terpolymer ethylene/propylene/diene (EPDM) or a tetrapolymer or the like. Using an elastomer for the flow field is especially advantageous since the flow field may be manufactured by molding techniques.

It should be noted that the resilient mass flow field of the present invention can be used on either the anode side or the cathode side of the cell. When an elastomer is used for the resilient material for the mass flow fields, it is preferable to put the resilient flow field on the side that is less corrosive, since an elastomer is a polymer which can be degraded. However, elastomers such as EPDM have been found to stand up to corrosive materials such as HCl and chlorine.

The electrochemical cell of the first and second embodiments may also comprise an anode mass flow manifold 32 and a cathode mass flow field manifold 34 as shown in FIGS. 1 and 1A. The purpose of such manifolds is to bring products to and reactants from both the anode and the cathode, as well as to form a frame around the anode mass flow field and the anode, and the cathode mass flow field and the cathode, respectively. These manifolds are preferably made of a corrosion resistant material, such as PFA. A gasket 36, 38, also contributes to forming a frame around the respective anode and cathode mass flow fields. These gaskets are preferably also made of a corrosion resistant material, such as PTFE.

The electrochemical cell of the first and second embodiments also comprises an anode current bus 46 and a cathode current bus 48 as shown in FIG. 1. The current buses conduct current to and from a voltage source (not shown). Specifically, anode current bus 46 is connected to the positive terminal of a voltage source, and cathode current bus 48 is connected to the negative terminal of the voltage source, so that when all of the cell components to the right of current bus 46 as shown in FIG. 1, including current bus 48, from which it returns to the voltage source. The current buses are made of a conductor material, such as copper.

The electrochemical cell of the first and second embodiments of the present invention further comprises a current distributor disposed in contact with the flow field. An anode current distributor 40 is disposed in contact with anode flow field 28, and a cathode current distributor 42 is disposed in contact with cathode flow field 30. The anode current collects current from the anode bus and distributes it to the anode by electronic conduction. The cathode current distributor collects current from the cathode and distributes it to the cathode bus by electronic conduction. The anode and the cathode current distributors preferably each comprise a non-porous layer. The anode current distributor thus provides a barrier between the anode and the current bus, as well as between the current bus and the hydrogen halide, such as hydrogen chloride, and the halogen gas, such as chlorine gas. The cathode current distributor provides a barrier between the cathode current bus and the cathode, as well as between the cathode current bus and the hydrogen halide. This is desirable because there is some migration of hydrogen halide through the membrane. The current distributors of the present invention may be made of a variety of materials, and the material used for the anode current distributor need not be the same as the material used for the cathode current distributor. In one instance, the anode current distributor is made of platinized tantalum, and the cathode current distributor is made of a nickel-based alloy, such as UNS10665, sold as HASTELLOY® B-2, by Haynes, International.

In the first and second embodiments, the electrochemical cell also comprises a conductive structural support 44 disposed in contact with anode current distributor 40. The support on the anode side is preferably made of UNS31603 (316L stainless steel). A seal 45, preferably in the form of an O-ring made from a perfluoroelastomer, sold in parts under the trademark KALREZ® by DuPont, is disposed between structural support 44 on the anode side and anode current distributor 40. It should be noted that while structural support 44 is shown in front of anode current bus 46 in FIG. 1, it is within the scope of the present invention for the structural support to be placed behind the anode current bus (i.e., to the left of bus 46 as shown in FIG. 1) and still achieve the same results. The cathode current distributor acts as a corrosion-resistant structural backer on the cathode side. This piece can be drilled and tapped to accept the PFA fitting, which is used for the inlet and outlet.

When more than one anode-cathode pair is used, such as in manufacturing, a bipolar arrangement, as familiar to one skilled in the art, is preferred. The electrochemical cell of the present invention may be used in a bipolar stack. To create such a bi-polar stack, current distributors 40 and 42 and all the elements disposed in between as shown in FIG. 1 are repeated along the length of the cell, and current buses are placed on the outside of the stack.

Further in accordance with the first and second embodiments of the present invention, there is provided a process for the direct production of essentially dry halogen gas from essentially anhydrous hydrogen halide. The anhydrous hydrogen halide may comprise hydrogen chloride, hydrogen bromide, hydrogen fluoride or hydrogen iodide. It should be noted that the production of bromine gas and iodine gas can be accomplished when the electrochemical cell is run at elevated temperatures (i.e., about 60° C. and above for bromine and about 190° C. and above for iodine). In the case of iodine, a membrane other than NAFION® should be used.

The operation of the electrochemical cell for a preferred version of the first embodiment, where hydrogen, as well as chlorine gas, is produced by the cell, will now be described as it relates to a preferred embodiment of the process of the present invention, where the anhydrous hydrogen halide is hydrogen chloride. In operation, current flows to the anode bus and anode current distributor 40 collects current from the anode bus and distributes it to the anode by electronic conduction. Molecules of essentially anhydrous hydrogen chloride gas are fed to anode-side inlet 14 and through flow channels 29 in the anode mass flow field 28 and are transported to the surface of anode 12. The molecules are oxidized at the anode under the potential created by the voltage source to produce essentially dry chlorine gas (Cl$_2$ (g)) at the anode, and protons (H$^+$). This reaction is given by the equation:

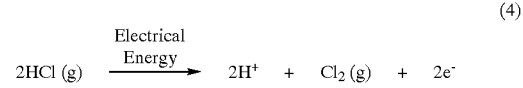

(4)

The chlorine gas (Cl$_2$(g)) exits through anode-side outlet 16 as shown in FIG. 1. The protons (H$^+$) are transported through the membrane, which acts as an electrolyte. The transported protons are reduced at the cathode. This reaction for the first embodiment is given by the equation:

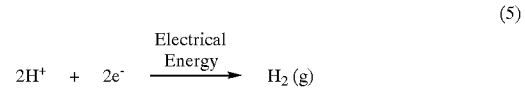

(5)

Water is delivered to the cathode through cathode-side inlet 24 and through the flow channels in cathode flow field 30 to hydrate the membrane and thereby increase the efficiency of proton transport through the membrane. In the first embodiment, the hydrogen which is evolved at the interface between the electrode and the membrane exits via cathode-side outlet 26 as shown in FIG. 1. The hydrogen bubbles through the water and is not affected by the PTFE in the electrode. Cathode current distributor 42 collects current from cathode 20 and distributes it to cathode bus 48.

The operation of the electrochemical cell according to the second embodiment will now be described as it relates to a preferred embodiment of the process of the present invention, where the anhydrous hydrogen halide is hydrogen chloride. In operation, current flow to the anode bus, and anode current distributor 40 collects current from the anode bus and distributes it to the anode by electronic conduction. Molecules of essentially anhydrous hydrogen chloride are fed to anode-side inlet 14 and are transported through grooves of anode mass flow field 28 to the surface of anode 12. An oxygen-containing gas, such as oxygen (O$_2$(g), air or oxygen-enriched air (i.e., greater than 21 mol % oxygen in nitrogen) is introduced through cathode-side inlet 24 and through the grooves formed in cathode mass flow field 30. Although air is cheaper to use, cell performance is enhanced when enriched air or oxygen is used. This cathode feed gas may be humidified to aid in the control of moisture in the membrane. Molecules of the hydrogen chloride (Hcl(g)) are oxidized under the potential created by the voltage source to produce essentially dry chlorine gas at the anode, and protons (H$^+$), as expressed in equation (4) above. The chlorine gas (Cl$_2$) exits through anode-side outlet 16 as shown in FIG. 1. The protons (H$^+$) are transported through the membrane, which acts as an electrolyte. Oxygen and the transported protons are reduced at the cathode to water, which is expressed by the equation:

$$\tfrac{1}{2}O_2(g) + 2e^- + 2H^+ \rightarrow H_2O(g) \qquad (6)$$

The water formed (H$_2$O(g) in equation (6)) exits via cathode-side outlet 26 as shown in FIG. 1, along with any nitrogen and unreacted oxygen. The water also helps to maintain hydration of the membrane, as will be further explained below. Cathode current distributor 42 collects current from cathode 20 and distributes it to cathode bus 48 by electronic conduction.

In this second embodiment, the cathode reaction is the formation of water. This cathode reaction has the advantage of more favorable thermodynamics relative to $H_2$ production at the cathode as in the first embodiment. This is because the overall reaction in this embodiment, which is expressed by the following equation:

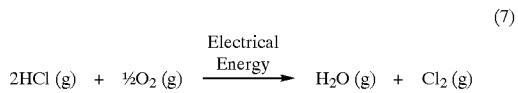

(7)

involves a smaller free-energy change than the free-energy change for the overall reaction in the first embodiment, which is expressed by the following equation:

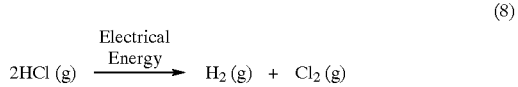

(8)

Thus, the amount of voltage or energy required as input to the cell is reduced in this second embodiment.

In the first and second embodiments, the cathode-side of the membrane must be kept hydrated in order to increase the efficiency of proton transport through the membrane. In the first embodiment, which has a hydrogen-producing cathode, the hydration of the membrane is obtained by keeping liquid water in contact with the cathode. The liquid water passes through the gas-diffusion electrode and contacts the membrane. In the second embodiment, which has a water-producing cathode, the membrane hydration is accomplished by the production of water as expressed by equation (6) above and by the water introduced in a humidified oxygen-feed or air-feed stream. This keeps the conductivity of the membrane high.

In either of the first or second embodiments, the electrochemical cell can be operated over a wide range of temperatures. Room temperature operation is an advantage, due to the ease of use of the cell. However, operation at elevated temperatures provides the advantages of improved kinetics and increased electrolyte conductivity. Higher temperatures result in lower cell voltages. However, limits on temperature occur because of the properties of the materials used for elements of the cell. For example, the properties of a NAFION® membrane change when the cell is operated above 120° C. The properties of a polymer electrolyte membrane make it difficult to operate a cell at temperatures above 150° C. With a membrane made of other materials, such as a ceramic material like beta-alumina, it is possible to operate a cell at temperatures above 200° C. It should be noted also that one is not restricted to operate the electrochemical cell of either the first or the second embodiment at atmospheric pressure. The cell could be run at differential pressure gradients, which change the transport characteristics of water or other components in the cell, including the membrane.

Figure 2:
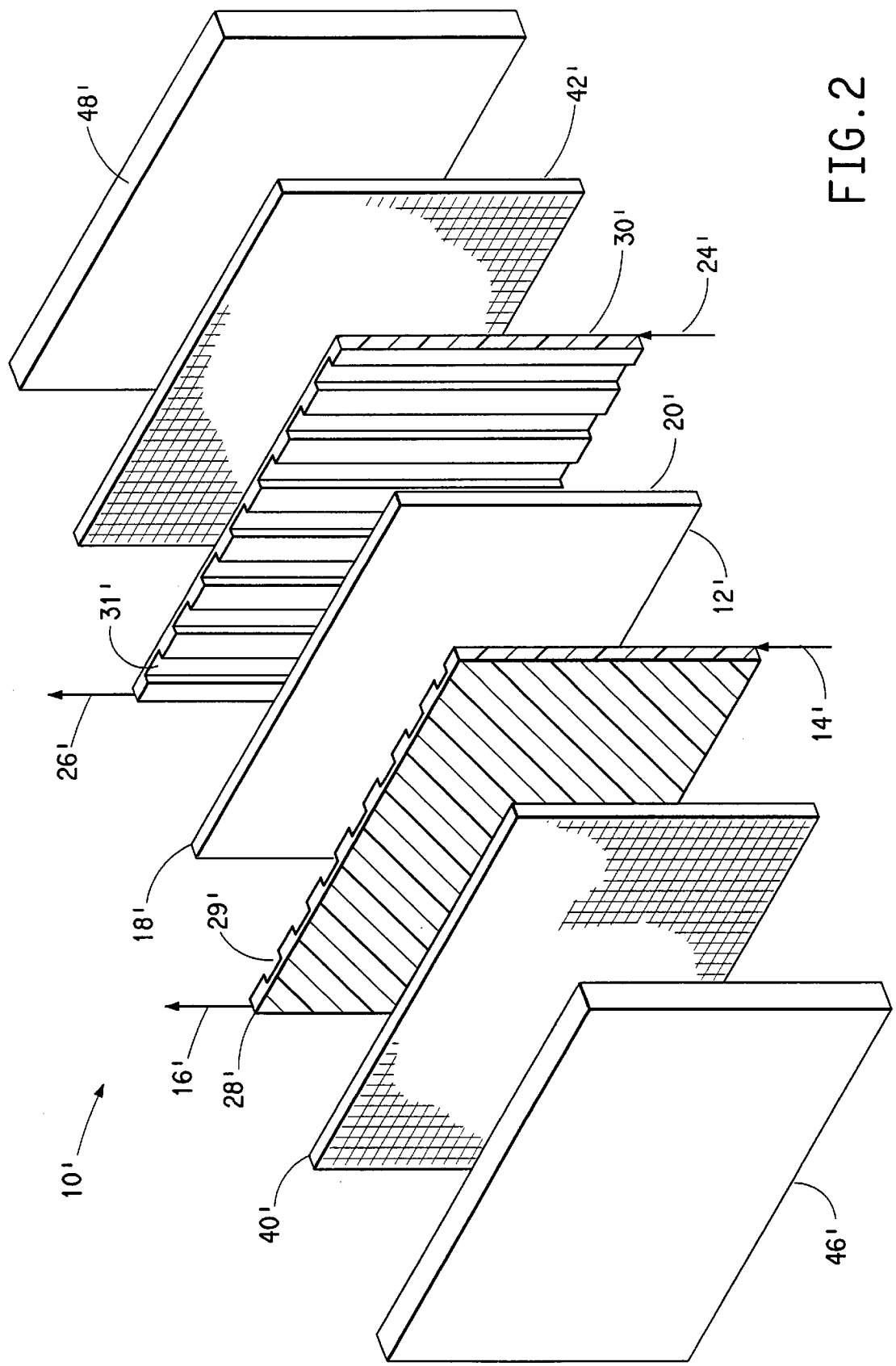
FIG. 2 is a perspective view of an electrochemical cell for producing halogen gas from aqueous hydrogen halide according to a third embodiment of the present invention.

FIG. 2 illustrates a third embodiment of the present invention. Wherever possible, elements corresponding to the elements of the embodiment of FIG. 1 will be shown with the same reference numeral as in FIG. 1, but will be designated with a prime ('). An electrochemical cell of the third embodiment is shown generally at 10' in FIG. 2. The electrochemical cell of the third embodiment will be described with respect to a preferred embodiment, where halogens, such as chlorine, are generated by the electrolysis of an aqueous solution of a hydrogen halide, such as hydrochloric acid. One could also use this cell for other uses, for instance, in a chlor-alkali system, with brine and hydrochloric acid. Alternatively, the cell of the third embodiment may be a fuel cell.

The electrochemical cell of the third embodiment comprises an electrode, or more specifically, an anode 12'. The electrochemical cell of the third embodiment also comprises a membrane disposed in contact with one side of the electrode. A membrane 18' is shown in FIG. 2 having one side disposed in contact with one side of anode 12'. Unlike the membrane in the first embodiment, the membrane need not necessarily be a cation-transporting membrane. The electrochemical cell of the third embodiment also comprises an electrode, or more specifically, a cathode 20', where cathode 20' is disposed in contact with the other side (as opposed to the side which is in contact with the anode) of membrane as illustrated in FIG. 2.

The electrochemical cell of the third embodiment further comprises a mass flow field disposed in contact with the electrode. The mass flow field may be an anode mass flow field 28' disposed in contact with the anode, or a cathode mass flow field 30' disposed in contact with the cathode. The mass flow fields act as both mass and current flow fields. The purpose of the anode flow field is to get reactants, such as aqueous HCl in the third embodiment, to the anode, and products, such as wet chlorine gas, from the anode. The purpose of the cathode flow field is to get catholyte to the cathode and product from the cathode. The mass flow fields of the third embodiment include flow channels 29' and 31' for performing these functions. In the third embodiment, the mass flow fields comprise a resilient material, such as an elastomer, which is the same as that described above with respect to the first two embodiments.

The electrochemical cell of the third embodiment also comprises a current bus for conducting current to the electrode, where the current bus is disposed on the other side of the electrode. An anode current bus 46' and a cathode current bus 48' are shown in FIG. 2. The current buses conduct current from a voltage source (not shown). Specifically, anode current bus 46' is connected to the positive terminal of a voltage source, and cathode current bus 48' is connected to the negative terminal of the voltage source, so that when voltage is supplied to the cell, current flows from the voltage source through all of the elements to the right of current bus 46' as shown in FIG. 2, including current bus 48', from which it returns to the voltage source. As in the first two embodiments, the current buses of the third embodiment are made of a conductor material, such as copper.

The electrochemical cell of the third embodiment further comprises a current distributor disposed on one side of the electrode. An anode current distributor 40' is disposed on one side of anode 12', and a cathode current distributor 42' is disposed on one side of cathode 20'. As in the first two embodiments, the anode current distributor distributes current to the anode by electronic conduction and allows current to flow away from the anode. The cathode current distributor distributes current to the cathode by electronic conduction and allows current to flow to the cathode. The anode and the cathode current distributors preferably each comprise a non-porous layer. Moreover, as in the first two embodiments, the anode current distributor provides a barrier between the anode current bus and the anode, as well as between the anode current bus and the reactant, such as aqueous hydrogen chloride and the product, such as wet gaseous chlorine. The cathode current distributor provides a barrier between the cathode current bus and the cathode, as well as between the cathode current bus and the catholyte.

The current distributors of third embodiment may be made of a variety of materials, and the material used for the anode current distributor need not be the same as the material used for the cathode current distributor. The choice of material would depend on the choice of anolyte and catholyte.

As known to one skilled in the art, if electrodes are placed on opposite faces of membrane, cationic charges (protons in the HCl reaction being described) are transported through the membrane from anode to cathode, while each electrode carries out a half-cell reaction. In the third embodiment, hydrochloric acid, which is introduced at arrow 14', which indicates the anode-side inlet, is electrolyzed at anode 12' to produce gaseous chlorine, which exits at arrow 16', which represent the anode-side outlet, and hydrogen ions ($H^+$). The $H^+$ ions are transported across membrane 18', to cathode 201 along with some water and some hydrochloric acid. The hydrogen ions are discharged at the cathode through a cathode-side outlet 26'. A cathode-side inlet, which is optional, depending on the use of the cell, is shown at 24' in FIG. 2.

Additional advantages and modifications will readily occur to those skilled in the art. The invention, in its broader aspects, is, therefore, not limited to the specific details, representative apparatus and illustrative Examples shown and described. Accordingly, departures may be made from such details without departing from the spirit or scope of the general inventive concept as defined by the appended claims and their equivalents.

What is claimed is:

1. An electrochemical cell for directly producing essentially dry halogen gas from essentially anhydrous hydrogen halide, comprising:
   (a) means for oxidizing molecules of essentially anhydrous hydrogen halide to produce essentially dry halogen gas and protons;
   (b) cation-transporting means for transporting the protons therethrough;
   (c) means for reducing the transported protons, wherein the cation-transporting means has one side disposed in contact with the reducing means;
   (d) current conducting means disposed on the other side of the reducing means for conducting current to and from the reducing means, the cation-transporting means and the oxidizing means; and
   (e) mass flow field means disposed between the reducing means and the current conducting means for providing uniform electrical contact between the reducing means and the current conducting means, wherein the mass flow field means comprises a resilient material.

2. The electrochemical cell of claim 1, wherein the oxidizing means is an anode, the cation-transporting means is a membrane, the reducing means is a cathode and the mass flow field is a cathode mass flow field.

3. The electrochemical cell of claim 2, wherein the flow field is conductive.

4. The electrochemical cell of claim 2, wherein the cation-transporting membrane is a proton-transporting membrane.

5. The electrochemical cell of claim 4, wherein the proton-transporting membrane comprises a copolymer of at least two monomers, wherein at least one of the monomers has pendant sulfonic acid groups.

6. The electrochemical cell of claim 5, wherein the proton-transporting membrane comprises a copolymer of tetrafluoroethylene and poly-sulfonyl fluoride vinyl ether-containing pendant sulfonic acid groups.

7. The electrochemical cell of claim 2, wherein the anode mass flow field is disposed in contact with the anode, further comprising a cathode mass flow field disposed in contact with the cathode, wherein the anode and the cathode mass flow fields have flow channels formed therein.

8. The electrochemical cell of claim 7, further comprising means for hydrating the membrane disposed in fluid communication with the flow channels of the cathode mass flow field.

9. The electrochemical cell of claim 8, wherein the hydrating means is a cathode-side inlet for supplying water to the membrane.

10. The electrochemical cell of claim 8, wherein the hydrating means is a cathode-side inlet for supplying an oxygen-containing gas to the cathode to form water, and the water is supplied to the membrane.

11. The electrochemical cell of claim 8, wherein the anode mass flow field and the cathode mass flow field comprises ethylene/propylene/diene.

12. The electrochemical cell of claim 11, wherein the conductive material of the anode mass flow field and the cathode mass flow field is carbon.

13. The electrochemical cell of claim 12, wherein the anode comprises ruthenium oxide.

14. The electrochemical cell of claim 13, wherein the membrane comprises a copolymer of tetrafluoroethylene and poly-sulfonyl fluoride vinyl ether-containing pendant sulfonic acid groups.

15. The electrochemical cell of claim 7, wherein the flow channels of the anode mass flow field and of the cathode mass flow field are both vertical.

16. The electrochemical cell of claim 2, wherein the anode and the cathode each comprise an electrochemically active material.

17. The electrochemical cell of claim 16, wherein the anode and the cathode are gas diffusion electrodes.

18. The electrochemical cell of claim 17, wherein the catalyst loading of the electrochemically active material is in the range of 0.10 to 0.50 mg/cm$^2$.

19. The electrochemical cell of claim 16, wherein the electrochemically active material of the anode and the electrochemically active material of the cathode each comprises one of the following: platinum, ruthenium, osmium, rhenium, rhodium, iridium, palladium, gold, titanium, and zirconium, and the oxides, alloys and mixtures thereof.

20. The electrochemical cell of claim 19, wherein the electrochemically active material of the anode comprises ruthenium oxide.

21. The electrochemical cell of claim 20, wherein the electrochemically active material of the cathode comprises platinum.

22. The electrochemical cell of claim 19, wherein the electrochemically active material of both the anode and the cathode comprises platinum.

23. The electrochemical cell of claim 16, wherein the electrochemically active material is bonded to a support structure.

24. The electrochemical cell of claim 23, wherein the support structure comprises carbon paper.

25. The electrochemical cell of claim 23, wherein the support structure comprises graphite cloth.

26. The electrochemical cell of claim 23, wherein the electrochemically active material comprises a catalyst material on a support material.

27. The electrochemical cell of claim 26, wherein the support material comprises particles of carbon and particles of polytetrafluoroethylene.

28. The electrochemical cell of claim 27, wherein the electrochemically active material is bonded by the particles of polytetrafluoroethylene to the support structure.

29. The electrochemical cell of claim 16, wherein the electrochemically active material of each of the anode and the cathode is applied as a film from an ink onto the membrane.

30. The electrochemical cell of claim 2, wherein the flow field comprises a chemically resistant material.

31. The electrochemical cell of claim 1, wherein the resilient material is loaded with a conductive material.

32. The electrochemical cell of claim 31, wherein the resilient material is an elastomer.

33. The electrochemical cell of claim 32, wherein the elastomer is ethylene/propylene/diene.

34. The electrochemical cell of claim 33, wherein the conductive material is a metal.

35. The electrochemical cell of claim 33, wherein the conductive material is carbon.

* * * * *